United States Patent
Moradi et al.

(10) Patent No.: US 9,559,748 B2
(45) Date of Patent: Jan. 31, 2017

(54) METHODS AND APPARATUSES USING FILTER BANKS FOR MULTI-CARRIER SPREAD SPECTRUM SIGNALS

(71) Applicant: BATTELLE ENERGY ALLIANCE, LLC., Idaho Falls, ID (US)

(72) Inventors: Hussein Moradi, Ammon, ID (US); Behrouz Farhang, Salt Lake City, UT (US); Carl A Kutsche, Idaho Falls, ID (US)

(73) Assignee: BATTELLE ENERGY ALLIANCE, LLC, Idaho Falls, ID (US)

( * ) Notice: Subject to any disclaimer, the term of this patent is extended or adjusted under 35 U.S.C. 154(b) by 0 days.

(21) Appl. No.: 15/061,157

(22) Filed: Mar. 4, 2016

(65) Prior Publication Data
US 2016/0191114 A1 Jun. 30, 2016

Related U.S. Application Data

(60) Division of application No. 14/498,035, filed on Sep. 26, 2014, now Pat. No. 9,369,866, which is a
(Continued)

(51) Int. Cl.
*H04B 1/00* (2006.01)
*H04B 1/7093* (2011.01)
(Continued)

(52) U.S. Cl.
CPC ............ *H04B 1/7093* (2013.01); *H04B 1/707* (2013.01); *H04B 1/709* (2013.01); *H04B 1/71* (2013.01);
(Continued)

(58) Field of Classification Search
CPC ............ H04L 2209/24; H04L 2209/80; H04L 27/264; H04L 1/04; H04L 9/0816; H04L 5/0021; H04B 2001/70935; H04B 1/7093; H04B 1/709; H04B 1/707; H04B 1/71; H04B 1/69; H04W 12/04
See application file for complete search history.

(56) References Cited

U.S. PATENT DOCUMENTS 3,849,730 A 11/1974 Ho
5,204,901 A 4/1993 Hershey et al.
(Continued)

FOREIGN PATENT DOCUMENTS

CN 1503463 A 6/2004

OTHER PUBLICATIONS

Farhang-Boroujeny, B., "Square-root Nyquist (M) filter design for digital communication systems," IEEE Trans. On Signal Processing, vol. 56, No. 5, May 2008, pp. 2127-2132.
(Continued)

*Primary Examiner* — Dac Ha
(74) *Attorney, Agent, or Firm* — TraskBritt

(57) ABSTRACT

A transmitter includes a synthesis filter bank to spread a data symbol to a plurality of frequencies by encoding the data symbol on each frequency, apply a common pulse-shaping filter, and apply gains to the frequencies such that a power level of each frequency is less than a noise level of other communication signals within the spectrum. Each frequency is modulated onto a different evenly spaced subcarrier. A demodulator in a receiver converts a radio frequency input to a spread-spectrum signal in a baseband. A matched filter filters the spread-spectrum signal with a common filter having characteristics matched to the synthesis filter bank in the transmitter by filtering each frequency to generate a sequence of narrow pulses. A carrier recovery unit generates control signals responsive to the sequence of narrow pulses
(Continued)

suitable for generating a phase-locked loop between the demodulator, the matched filter, and the carrier recovery unit.

23 Claims, 6 Drawing Sheets

Related U.S. Application Data continuation of application No. 14/051,274, filed on Oct. 10, 2013, now Pat. No. 8,861,571, which is a division of application No. 13/311,357, filed on Dec. 5, 2011, now Pat. No. 8,731,027.

(51) Int. Cl.
| | | |
|---|---|---|
| H04B 1/709 | (2011.01) | |
| H04B 1/707 | (2011.01) | |
| H04L 27/26 | (2006.01) | |
| H04L 1/04 | (2006.01) | |
| H04L 9/08 | (2006.01) | |
| H04W 12/04 | (2009.01) | |
| H04L 5/00 | (2006.01) | |
| H04B 1/71 | (2011.01) | |
| H04B 1/69 | (2011.01) | |

(52) U.S. Cl.
CPC .............. *H04L 1/04* (2013.01); *H04L 5/0021* (2013.01); *H04L 9/0816* (2013.01); *H04L 27/264* (2013.01); *H04W 12/04* (2013.01); *H04B 1/69* (2013.01); *H04B 2001/70935* (2013.01); *H04L 2209/24* (2013.01); *H04L 2209/80* (2013.01)

(56) References Cited

U.S. PATENT DOCUMENTS

| | | | |
|---|---|---|---|
| 6,154,484 | A | 11/2000 | Lee et al. |
| 6,272,121 | B1 | 8/2001 | Smith et al. |
| 6,553,396 | B1 | 4/2003 | Fukuhara et al. |
| 6,651,408 | B1* | 11/2003 | McClure ............. A01F 15/0715 242/421.2 |
| 6,741,551 | B1 | 5/2004 | Cherubini |
| 7,180,963 | B2 | 2/2007 | Wang et al. |
| 7,394,844 | B1 | 7/2008 | Orr |
| 7,443,917 | B2 | 10/2008 | Vitenberg |
| 7,558,310 | B1 | 7/2009 | von der Embse |
| 7,609,611 | B1 | 10/2009 | Siohan et al. |
| 7,634,030 | B2 | 12/2009 | Kim et al. |
| 7,787,545 | B2 | 8/2010 | Orr et al. |
| 7,898,936 | B2 | 3/2011 | Al Adnani |
| 8,731,027 | B2 | 5/2014 | Moradi et al. |
| 2002/0034160 | A1 | 3/2002 | Marchok et al. |
| 2002/0167991 | A1* | 11/2002 | Suzuki ..................... H04B 1/69 375/130 |
| 2003/0072382 | A1 | 4/2003 | Raleigh et al. |
| 2004/0047430 | A1 | 3/2004 | McCarty, Jr. |
| 2004/0101068 | A1 | 5/2004 | Wang et al. |
| 2004/0213351 | A1 | 10/2004 | Shattil |
| 2005/0047513 | A1 | 3/2005 | Vitenberg |
| 2005/0245268 | A1 | 11/2005 | Green et al. |
| 2008/0130802 | A1 | 6/2008 | Conroy et al. |
| 2008/0226003 | A1 | 9/2008 | Chevalier et al. |
| 2008/0316912 | A1 | 12/2008 | Al Adnani |
| 2009/0316568 | A1 | 12/2009 | Harris et al. |
| 2010/0246375 | A1 | 9/2010 | Orlik et al. |
| 2011/0002232 | A1 | 1/2011 | Niewczas et al. |
| 2011/0188671 | A1 | 8/2011 | Anderson et al. |
| 2012/0002703 | A1 | 1/2012 | Yamashita et al. |
| 2013/0142218 | A1 | 6/2013 | Moradi et al. |
| 2014/0169431 | A1* | 6/2014 | Arambepola ....... H04L 27/0006 375/227 |

OTHER PUBLICATIONS

Farhang-Boroujeny, "OFDM Versus Filter Bank Multicarrier," IEEE Signal Processing Magazine, vol. 28, No. 3, May 1, 2011, pp. 92-112.

Nigam et al., "Finite Duration Root Nyquist Pulses with Maximum In-Band Fractional Energy," IEEE Communications Letters, vol. 14, No. 9, Sep. 2010, pp. 797-799.

PCT International Search Report and Written Opinion of the International Searching Authority for PCT/US2012/049372, dated Oct. 19, 2012, 13 pages.

International Preliminary Report on Patentability for International Application No. PCT/US2012/049372, dated Jun. 10, 2014, 11 pages.

Office Action with Search Report for Chinese Application No. 201280068999.2, issued Apr. 24, 2015, 24 pages.

Supplementary Search Report for European Patent Application No. 12855027.4, Dated Jul. 7, 2015, 6 pages.

Wasden et al., "Design and Implementation of a Multicarrier Spread Spectrum Communication System," Military Communication Conference, IEEE, Oct. 29, 2012, pp. 1-7.

Second Office Action with Search Report for Chinese Application No. 201280068999.2, issued Mar. 4, 2016, 20 pages.

Third Office Action with Search Report for Chinese Application No. 201280068999.2, issued Aug. 29, 2016, 8 pages with English translation.

\* cited by examiner

METHODS AND APPARATUSES USING FILTER BANKS FOR MULTI-CARRIER SPREAD SPECTRUM SIGNALS

CROSS-REFERENCE TO RELATED APPLICATIONS

This application is a divisional of U.S. patent application Ser. No. 14/498,035, filed Sep. 26, 2014, which is a continuation of U.S. patent application Ser. No. 14/051,274, filed Oct. 10, 2013, now U.S. Pat. No. 8,861,571, issued Oct. 14, 2014, which is a divisional of U.S. patent application Ser. No. 13/311,357, filed Dec. 5, 2011, now U.S. Pat. No. 8,731,027, issued May 20, 2014, the disclosure of each of which is hereby incorporated herein in its entirety by this reference.

GOVERNMENT RIGHTS

This invention was made with government support under Contract Number DE-AC07-05ID14517 awarded by the United States Department of Energy. The government has certain rights in the invention.

FIELD

Embodiments of the present disclosure are directed to the field of wireless transmission of signals and, more particularly, to wireless transmission of spread-spectrum signals.

BACKGROUND

There is a trend in multi-carrier mobile communication consumer equipment towards the provision of multimode wireless services using various standards, which are continuously being updated. As the demand for personalized applications suited to diverse needs continues to grow, there is an increasing need for multimode terminals that can provide seamless connectivity between different multi-carrier modes and that can be upgraded according to user needs.

A spread-spectrum (SS) technique is often used to distribute wireless transmit signals over a wider bandwidth than the minimum required transmission bandwidth. In military applications, SS transmission may be used to avoid jamming and also to reduce the probability of detection or interception. In civilian applications, some forms of SS, known as code-division multiple access (CDMA) may be used to allow multiple users to share the same channel or spectrum. Common techniques being used are direct-sequence spread spectrum (DS-SS) and frequency-hopping spread spectrum (FH-SS). These common SS techniques may suffer from susceptibility to narrow and partial band interference. Multi-Carrier Spread Spectrum (MC-SS) is a particular form of SS that is designed to be resistant to narrow and/or partial band interference. In one conventional form, Orthogonal Frequency Division Multiplexing (OFDM) techniques have been used for creating this spreading.

There is a need for apparatuses and methods that use a new way to generate and detect multi-carrier spread-spectrum signals that can carry information at a very low power level distributed over the frequency spectrum.

DETAILED DESCRIPTION

Figure 1A:
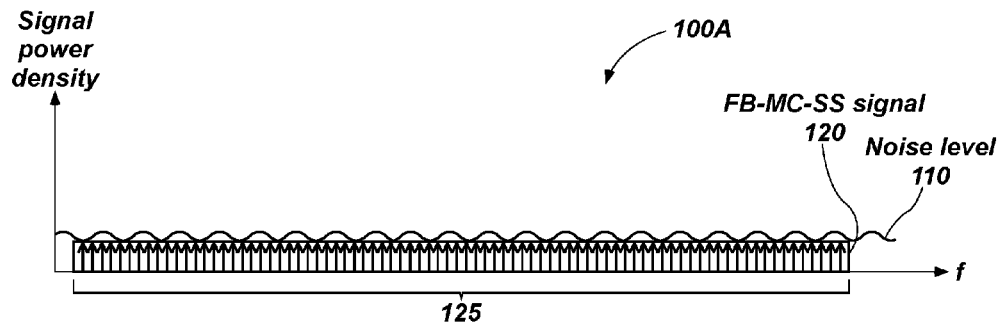
FIG. 1A shows a Filter-Bank Multi-Carrier Spread-Spectrum (FB-MC-SS) signal over a frequency spectrum and with a power level at or below a noise level.

In the following description, reference is made to the accompanying drawings in which are shown, by way of illustration, specific embodiments in which the disclosure may be practiced. The embodiments are intended to describe aspects of the disclosure in sufficient detail to enable those skilled in the art to make, use, and otherwise practice the invention. Furthermore, specific implementations shown and described are only examples and should not be construed as the only way to implement the present disclosure unless specified otherwise herein. It will be readily apparent to one of ordinary skill in the art that the various embodiments of the present disclosure may be practiced by numerous other partitioning solutions. Other embodiments may be utilized and changes may be made to the disclosed embodiments without departing from the scope of the disclosure. The following detailed description is not to be taken in a limiting sense, and the scope of the present invention is defined only by the appended claims.

In the following description, elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths, and the present disclosure may be implemented on any number of data signals including a single data signal.

The various illustrative logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor executes instructions (e.g., software code) stored on a computer-readable medium. A processor may also be implemented as a combination of computing devices, e.g., a combination of a DSP and a microprocessor, a plurality of microprocessors, one or more microprocessors in conjunction with a DSP core, or any other such configuration.

Also, it is noted that embodiments may be described in terms of a process that may be depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media include both computer storage media and communication media, including any medium that facilitates transfer of a computer program from one place to another.

Elements described herein may include multiple instances of the same element. These elements may be generically indicated by a numerical designator (e.g., 110) and specifically indicated by the numerical indicator followed by an alphabetic designator (e.g., 110A) or a numeric indicator preceded by a "dash" (e.g., 110-1). For ease of following the description, for the most part, element number indicators begin with the number of the drawing on which the elements are introduced or most fully discussed. Thus, for example, element identifiers on a FIG. 1 will be mostly in the numerical format 1xx and elements on a FIG. 4 will be mostly in the numerical format 4xx.

It should be understood that any reference to an element herein using a designation such as "first," "second," and so forth, does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

The term "bus" may be used to refer to a plurality of signals or conductors, which may be used to transfer one or more various types of information, such as data, addresses, control, or status. Additionally, a bus or a collection of signals may be referred to in the singular as a signal. Some drawings may illustrate signals as a single signal for clarity of presentation and description. It will be understood by a person of ordinary skill in the art that the signal may represent a bus of signals, wherein the bus may have a variety of bit widths, and the present disclosure may be implemented on any number of data signals, including a single data signal.

Embodiments of the present disclosure include apparatuses and methods for generating and receiving multi-carrier spread-spectrum signals carrying information at a very low power level distributed over the frequency spectrum.

Embodiments discussed herein use a unique implementation for MC-SS signals based on filter banks. Non-overlapping subcarrier filters used in the filter banks are used in transmit and receive systems that generate MC-SS signals that can coexist with other signals within the same spectrum. A Filter-Bank Multi-Carrier Spread-Spectrum (FB-MC-SS) signal may exist in an apparent noise level of other conventional communication signals operating at higher power. In addition, the FB-MC-SS signal may feature multiple redundancies in data symbol transmission. As a result of these characteristics, the FB-MC-SS may have a low probability of detection and interception, and may be able to operate under harsh RF environments and/or jamming conditions. FB-MC-SS signals pose little or no taxation on the spectrum under use because FB-MC-SS signals can transmit at or near the noise level of other signals and can be deployed on most any band of frequencies. In addition, FB-MC-SS signals may prove useful in rejecting narrow and partial band interferences as opposed to conventional SS techniques. For example, conventional techniques in which the subcarriers of the SS signal may simply drop communication rather than being able to determine interference and reduce the weight given to those subcarriers.

FIG. 1A shows a graph 100A illustrating an FB-MC-SS signal 120. The x-axis of the graph 100A represents the frequency of the signals over a frequency spectrum 125, and the y-axis of the graph 100A represents the spectral power density of the signals. Line 110 is a threshold that represents a noise level 110 over a frequency spectrum 125. The frequency spectrum 125 may have some desired bandwidth. As a non-limiting example, such a bandwidth may be 50 MHz.

The FB-MC-SS signal 120 has a power level at or below the noise level 110. The noise level 110 is a power level below which other communication signals being transmitted in the frequency spectrum 125 would consider noise that would not have a significant impact on their communication signal. The FB-MC-SS signal 120 may be considered an underlay control channel (i.e., "underlay," meaning it is below the noise level 110) with a relatively large number of subcarriers over the frequency spectrum 125. The subcarriers are illustrated by the arrows pointing up within a relatively small bandwidth illustrated by a box around each arrow. The number of subcarriers is generally selected to be a large number and may also be selected to be a power of two (i.e., $2^n$), such as, for example, 128, 2048, and 4096 subcarriers.

The FB-MC-SS signal 120 includes a data symbol modulated onto each subcarrier. Moreover, the same data symbol is redundantly modulated onto each subcarrier. In other words, each subcarrier of the FB-MC-SS signal 120 includes the same data. As a non-limiting example, the data symbol modulation may be as simple as a single bit modulated with binary phase shift keying (BPSK). In addition, more complex data symbol modulation techniques may be used for data symbols containing more data bits. For example, and without limitation, modulation techniques, such as quadrature phase shift keying (QPSK) and quadrature amplitude modulations (QAM), such as QAM 16, QAM 32, and QAM 64, may be used. Of course, these examples are intended to be non-limiting, and other data symbol modulation techniques are contemplated. Generally, the more simple modulation schemes may allow for easier data symbol recovery and may be more robust in embodiments transmitting at very low power levels.

Figure 1B:
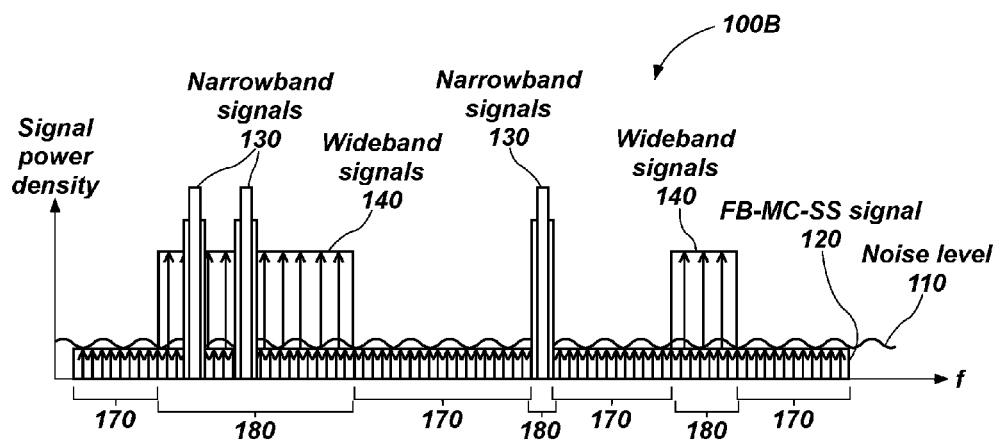
FIG. 1B shows the FB-MC-SS signal over a frequency band with other communication signals in the frequency spectrum.

FIG. 1B is a graph 100B showing the FB-MC-SS signal 120 over a frequency band with other communication signals being transmitted in the frequency spectrum 125. For example, various narrowband signals 130 and wideband signals 140 may be transmitted at various frequency bands within the frequency spectrum. The narrowband signals 130 and wideband signals 140 may collectively be referred to as communications signals 130, 140 herein.

Relative to other types of signals, a narrowband signal 130 tends to be in a relatively narrow frequency band and at a relatively higher power level. For example, depending on the frequencies involved, narrowband signals 130 may include single carrier (i.e., tone) signals or other relatively narrow frequency bands, such as Frequency Modulation (FM) signals, frequency hopping signals, public safety communication channels, and Global System for Mobile telecommunications (GSM) signals.

Wideband signals 140 may be signals that have multiple carriers spread over a relatively wide band, such as, for example, Orthogonal Frequency Division Multiplexing (OFDM) signals. A wideband signal 140 also tends to have a narrow frequency band around each subcarrier, but includes multiple subcarriers, which spreads the signal over a wider frequency band. In general, wideband signals 140 may be at a lower power level than narrowband signals 130. As non-limiting examples, power levels for the FB-MC-SS signal 120 may be in the 100-milliwatt range, whereas power levels for a wideband signal 140 or a narrowband signal 130 may be in the 2,000- to 10,000-milliwatt range.

In addition, in many definitions of spread-spectrum wideband signals, the frequency bands around each subcarrier may overlap by a small amount. In contrast, the FB-MC-SS signal 120 of embodiments of the present disclosure may be configured with narrow bands, such that there is little or no overlap of bands between adjacent subcarriers. In other words, the FB-MC-SS signal 120 spreads the signal over a set of spectrally isolated subcarrier bands.

Figure 1C:
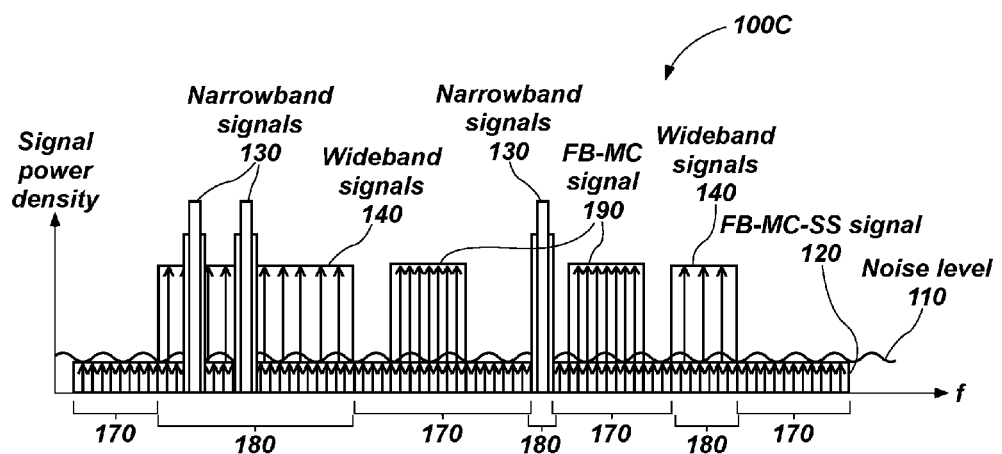
FIG. 1C shows the FB-MC-SS signal and other communication signals with high data rate overlay channels included in white spaces in the frequency spectrum.

The FB-MC-SS signal 120 may coexist with the communication signals 130, 140 because the power level is sufficiently near the noise level 110 such that the communication signals 130, 140 will consider the FB-MC-SS signal 120 to be at an apparent noise level. However, the communication signals 130, 140 may be considered as interference to the FB-MC-SS signal 120. Thus, braces below the graph in FIGS. 1B and 1C show interference bands 180 where there may be other communication signals 130, 140, and other braces show clear bands 170 where no detectable high power signals are located. As discussed more fully below, embodiments of the present disclosure may give no weight, or a relatively low weight, to carrier frequencies of the FB-MC-SS signal 120 that are in interference bands 180 and give a relatively high weight to carrier frequencies of the FB-MC-SS signal 120 that are in clear bands 170. In other words, the combined de-modulated FB-MC-SS signal 120 on the receiver side may contain a larger amount of the less noisy signals (i.e., non-interfered subcarriers of the FB-MC-SS signal 120) and a smaller amount of the more noisy signals (i.e., interfered subcarriers of the FB-MC-SS signal 120).

FIG. 1C is a graph 100C showing the FB-MC-SS signal 120 and other communication signals 130, 140 with filter bank multi-carrier (FB-MC) signals 190 included in white spaces in the clear bands 170 of the frequency spectrum 125. While the communication signals 130, 140 may be generated by other operators, the FB-MC signals 190 may be generated by the same operator that generates the FB-MC-SS signal 120. Thus, as discussed above, the FB-MC-SS signal 120 may be considered an underlay channel, whereas the FB-MC signal 190 may be considered an overlay channel (i.e., "overlay," meaning it is above the noise level 110) of the same operator. In addition, the FB-MC signal 190 may not be an SS signal. With the higher power, the FB-MC signals 190 may be configured with more complex data symbols and transmit different data symbols on each subcarrier. As a result, the data transmitted by the operator over the FB-MC signals 190 may have a relatively higher data rate than the FB-MC-SS signal 120. In addition, because of the pulse shaping characteristics described below, the FB-MC signals 190 may be more spectrally isolated. As a result, the FB-MC signals 190 may have subcarriers that are spaced closer together than other wideband signals 140, as indicated by the spacing of the arrows shown in FIG. 1C. As a result, the FB-MC signals 190 may have a relatively higher data rate than the other wideband signals 140 generated by other operators within the frequency spectrum 120.

Embodiments of the present disclosure may use the FB-MC-SS signal 120 to detect these white spaces. Once detected, an adaptive radio scenario may be set up whereby the higher power FB-MC signals 190 may be transmitted over carriers that occupy the white space. In such a scenario, the FB-MC-SS signal 120 may be thought of as an underlay control channel for detecting white spaces and controlling the higher data rate FB-MC signals 190 as the overlay channel. The adaptive radio occupation period for the high data rate overlay channels FB-MC signals 190 may be a relatively short period, such as, for example, 10 milliseconds, which may vary with different protocols defined for dynamic spectrum access of unused frequency spectrums.

Figure 2A:
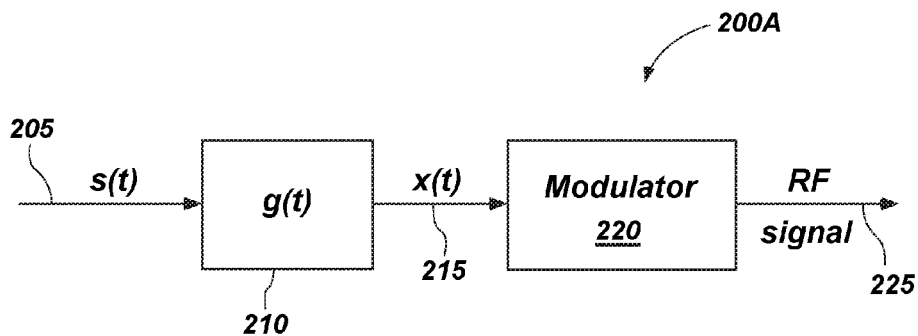
FIGS. 2A and 2B are block diagrams of a transmitter for generating the FB-MC-SS signal as an underlay signal.

FIG. 2A is a block diagram of a transmitter 200A for generating the FB-MC-SS signal 120 as an underlay signal. The transmitter 200A includes a pulse shaping and distribution module 210 and a modulator 220. The pulse shaping and distribution module 210 may be configured to receive input data symbols 205 (i.e., s(t)), and perform a filtering and spectrum distribution function (e.g., an impulse response represented by g(t)) to generate a baseband output signal 215 (i.e., x(t)). The modulator 220 receives the baseband output signal 215 to be modulated and up-converted for RF transmission as RF signal 225 (e.g., FB-MC-SS signal 120 (FIGS. 1A through 1C)).

In an embodiment for generating a low to medium data-rate FB-MC-SS signal 120 as an underlay control channel, one symbol may be transmitted at a time and that symbol is spread over all the carrier frequencies in the spread-spectrum signal. In other words, at a first symbol time, all subcarriers modulate the same first symbol, and at a second symbol time, all subcarriers modulate the same second symbol, etc. Thus, in one embodiment, each data symbol is a simple binary bit. Other embodiments may, however, include more complex modulation of multiple bits for each data symbol. In addition, when configured to transmit the higher data rate FB-MC signals 190 (FIG. 1C) as overlay channels, different data symbols may be transmitted on different subcarriers. In other words, for the overlay channel, the transmission may not be spread spectrum.

Figure 2B:
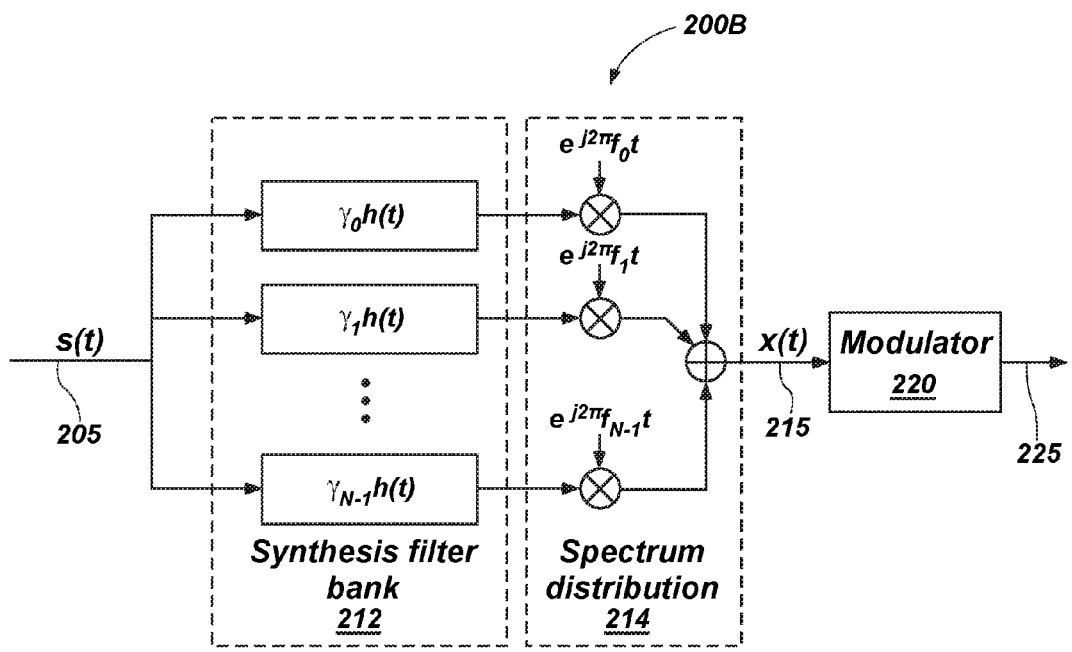

FIG. 2B is a block diagram of a transmitter 200B for generating the FB-MC-SS signal 120 (FIG. 1A) as an underlay signal. In this embodiment, the pulse shaping and distribution module 210 of FIG. 2A is separated into a synthesis filter bank 212 and a spectrum distribution module 214. The transmitter 200B further includes the modulator 220 configured as described above. The synthesis filter bank 212 receives the input data symbols 205, which is the information to be transmitted. The input data symbols 205 are filtered and gain added in the synthesis filter bank 212. The spectrum distribution module 214 is configured to add phase to the input data symbols 205 to generate the baseband output signal 215 that includes the data symbols distributed throughout the plurality of subcarriers of the frequency spectrum.

The pulse-shaping filter g(t) (FIG. 2A) on the transmitter side may be broken down into two separate components, namely a "prototype filter" h(t), and another function of time p(t), thus: g(t)=h(t)p(t). In other words, the input data symbols 205 are passed through the pulse-shaping filter g(t) (characterized by an impulse response represented by g(t)) before being modulated and up-converted for RF transmission.

With the input data symbols 205 defined as a train of data symbols s[n] at a spacing T, the input data symbols (s(t)) 205 may be expressed as:

$$s(t) = \sum_{n} s[n]\delta(t - nT). \tag{1}$$

In the synthesis filter bank 212, the prototype filter h(t) is a pulse-shaping filter that is the same for all subcarriers. Thus, the prototype filter h(t) may also be referred to herein as a pulse-shaping filter, and may be configured as a low-pass filter, such as a square-root Nyquist filter (e.g., square-root raised-cosine). Accordingly, one may note that the set of filters $\gamma_0 h(t)$ through $\gamma_{N-1} h(t)$ may be used to band-limit the stream of input data symbols 205 at each bank of the synthesis filter bank 212 and also to apply spreading gain factors $\gamma_0$ through $\gamma_{N-1}$ to each bank.

The spectrum distribution module 214 includes a set of modulators to the output of each bank to a different frequency within the spread spectrum. In other words, the modulators shift the spectra of the band-limited and spread signals to the set of subcarrier frequencies $f_0$ through $f_{N-1}$. The resulting subcarrier frequencies with the modulated signals are combined as a baseband output signal 215 with a spread-spectrum signal.

The modulator 220 up-converts the baseband output signal 215, represented as x(t), to the RF signal 225 for transmission. Combining equation (1) above with the filter functions of the synthesis filter bank 212 and the modulation function of the spectrum distribution module 214, results in an equation for the baseband output signal 215 as:

$$x(t) = \sum_{n} \sum_{k=0}^{N-1} \gamma_k s[n] h(t - nT) e^{j2\pi f_k t}. \tag{2}$$

When the subcarrier frequencies $f_k$ are selected such that $f_k T$, for k=0, 1, ..., N−1, is an integer, $e^{j2\pi f_k t} = e^{j2\pi f_k (t-nT)}$, equation (2) above can be arranged as:

$$x(t) = \sum_{n} s[n] g(t - nT) \tag{3}$$

where:

$$g(t) = h(t) p(t) \tag{4}$$

and $$p(t) = \sum_{k=0}^{N-1} \gamma_k e^{j2\pi f_k t}. \tag{5}$$

Thus, according to equation (4) above, g(t) may be represented as a multiplication of the prototype filter h(t) and another function of time p(t). This other function of time p(t) represented by equation (5) above may be determined by the spreading gains $\gamma_k$ and the subcarrier frequencies $f_k$.

Equation (3) above may be interpreted as, the FB-MC-SS signal x(t) is obtained by passing the data stream s[n] through the common pulse-shaping filter g(t). The choice of g(t), determined by h(t), the spreading gains $\gamma_k$, and the subcarrier frequencies $f_k$, can result in various forms of FB-MC-SS systems. When h(t) is a rectangular pulse with a width of T equal to the length of an FFT ($T_{FFT}$), plus the length of a cyclic prefix ($T_{CP}$), and the subcarrier frequencies $f_k$ are at the regular interval $1/T_{FFT}$, x(t) will be an OFDM-based SS signal, and, hence, may be referred to as OFDM-SS.

Another example is to generate a filtered multi-tone (FMT)-type spread-spectrum signal. As a non-limiting example, a square-root Nyquist filter may be implemented for h(t). A "root Nyquist" filter may be used as an abbreviation to a square-root Nyquist filter. One example of a square-root Nyquist filter is a square-root raised-cosine filter having a roll-off factor ($\alpha$). Thus, defining h(t) as the impulse response of a square-root raised-cosine filter with a roll-off factor ($\alpha$) and a symbol rate 1/T, and setting the subcarrier frequencies $f_k$ at a regular interval $(1+\alpha)/T$, the baseband output signal 215, x(t) will be an FMT-based SS signal. In addition, other choices of h(t) and $f_k$ that lead to other types of FB-MC-SS are also contemplated. For example, additional examples of square-root Nyquist filters include those described in B. Farhang-Boroujeny, "Square-root Nyquist (M) filter design for digital communication systems," *IEEE Trans. On Signal Processing*, vol. 56, no. 5, May 2008, pp. 2127-2132; and in G. Nigam, R. Singh, and A. K. Chaturvedi, "Finite Duration Root Nyquist Pulses with Maximum In-Band Fractional Energy," *IEEE Commun. Lett.*, vol. 14, no. 9, September 2010, pp. 797-799, the disclosure of each of which is incorporated herein by this reference. In addition, to facilitate a simplified receiver implementation, a roll-off factor ($\alpha$) equal to one may be selected. Other choices of the roll-off factor ($\alpha$) may be used, which may result in some modification to the receiver design.

For discussion, details of an FMT-SS system are developed more fully. Choosing FMT for multi-carrier modulation enables simplicity in analysis and design, which, in turn, results in a simple and robust MC-SS system. To develop the example, assume that N is even, set $\alpha=1$, and spread the subcarrier frequencies $f_k$ at the positions $\pm 1/T$, $\pm 3/T$, ..., ±(N−1)/T. More specifically, let $f_0 = -(N-1)/T$, $f_1 = -(N-3)/T$, ..., $f_{N-1} = (N-1)/T$. The spreading gain factors $\gamma_k$ are chosen as:

$$\gamma_k = e^{j\theta_k}, \text{ for } k=0,1,\ldots,N-1 \quad (6)$$

where $\theta_k$ is a set of phase angles that may be chosen to improve on the properties of the MC-SS waveform. Among various choices, $\theta_k = \pi k^2/N$ is an interesting set of phase angles, which belong to a class of polyphase codes. This set of phase angles leads to a transmit signal x(t) with a moderately low peak-to-average-power ratio (PAPR), which may be a significant parameter in designing the pulse shape g(t). As another example, one may also select the phase angles $\theta_k$ randomly. In any case, for any choice of $\theta_k$, in equation (6) above, the following identities hold:

$$|\gamma_k|^2 = 1, \text{ for } k=0,1,\ldots,N-1. \quad (7)$$

Figure 3A:
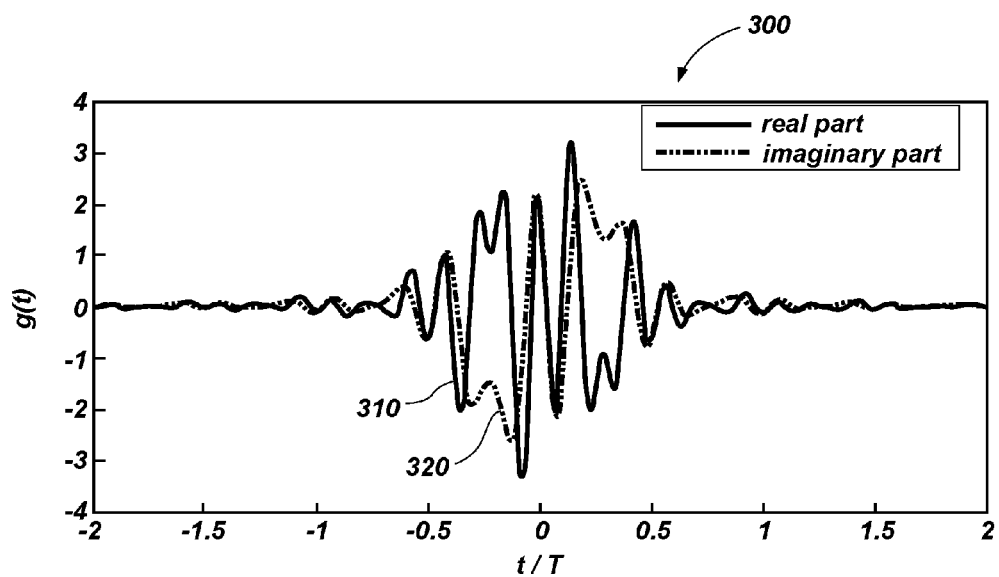
FIG. 3A is a graph that illustrates real and imaginary parts of filtered multi-tone functions in the time domain.
Figure 3B:
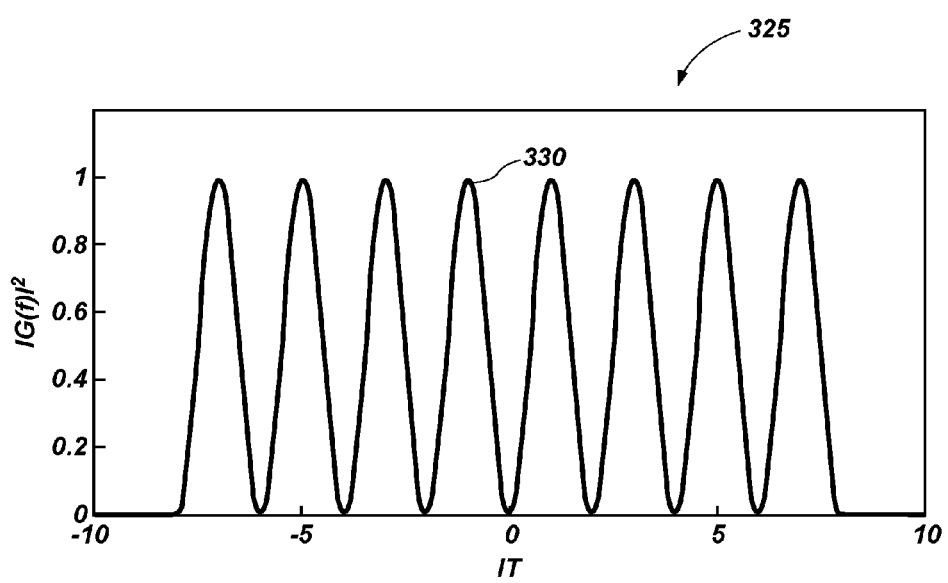
FIG. 3B is a graph that illustrates the filtered multi-tone function in the frequency domain.

FIG. 3A is a graph 300 that illustrates a real part 310 and an imaginary part 320 of a filtered multi-tone function in the time domain. FIG. 3B is a graph 325 that illustrates a filtered multi-tone function 330 in the frequency domain. Specifically, FIGS. 3A and 3B present an example of g(t) and the magnitude-squared of its Fourier transform, $|G(f)|^2$, when N=8 and h(t) is a square-root raised-cosine filter limited to the length of 4T. One may also note that the MC-SS signal x(t) has a spectrum that resembles that of $|G(f)|^2$.

Although the formulations above are given in terms of continuous time signals and filters, practical generation of the transmit waveform may be conveniently performed in discrete time using efficient signal processing blocks.

Figure 4:
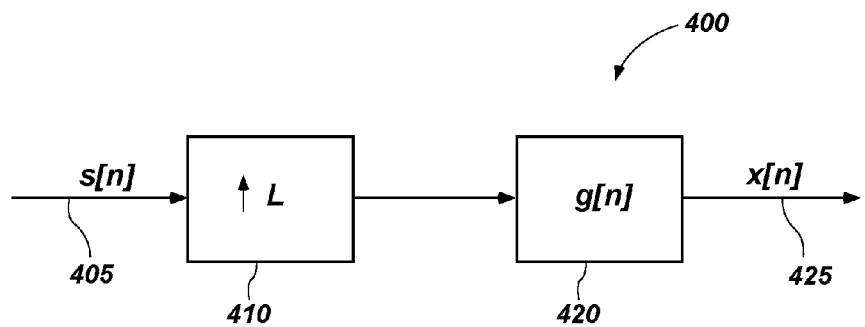
FIG. 4 is a block diagram of a transmitter showing signals represented as digital signals.

FIG. 4 is a block diagram of a transmitter 400 showing signals represented as digital signals. The transmitter 400 includes a sampling rate expander 410 and a discrete realization block 420. The sampling rate expander 410 receives a data symbol 405 and increases the sampling rate by a factor of L by inserting L−1 zeros after each sample of the input s[n]. The discrete-time realization block 420 performs the pulse-shaping filter h(t) and addition of the spreading gains $\gamma_k$, i.e., the synthesis filter bank 212, as well as the spectrum distribution 214 (FIG. 2B). Thus, the sequence g[n] may be thought of as a sampled version of g(t). As with the analog counterpart, the subcarriers are combined to generate a baseband output 425.

Figure 5:
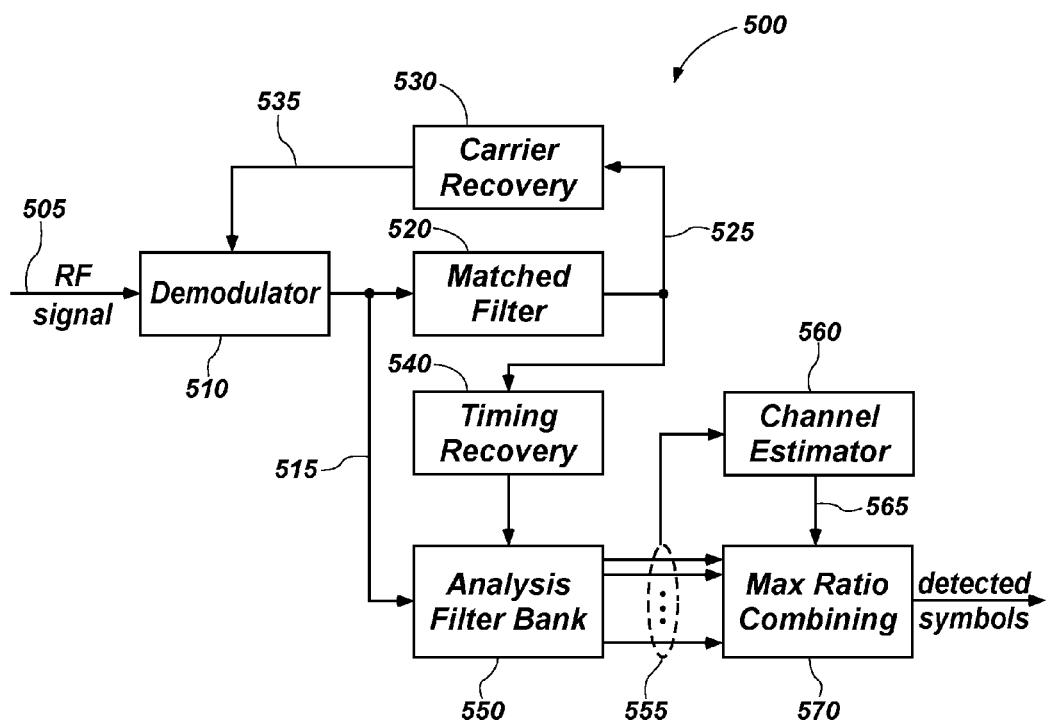
FIG. 5 is a block diagram of a receiver for detecting and decoding an FB-MC-SS signal of FIGS. 1A through 1C.

FIG. 5 is a schematic block diagram of a receiver 500 for detecting and decoding the FB-MC-SS signal 120 (FIGS. 1A through 1C). The receiver 500 includes a demodulator 510, matched filter 520, carrier recovery unit 530, timing recovery unit 540, analysis filter bank 550, channel estimator 560, and maximum-ratio combining unit 570. An RF signal 505 is received by the receiver 500 for processing. The RF signal 505 may be similar to the RF signal 225 generated by the transmitter 200A of FIG. 2A. Of course, the similarity may be somewhat distorted due to conditions such as multipath, interference, jamming, etc. The demodulator 510 receives the RF signal 505, and converts the RF signal 505 to a baseband input 515. The baseband input 515 is passed to the analysis filter bank 550 and the matched filter 520.

The matched filter 520 is configured to have filter characteristics matched to those of the synthesis filter bank 212 in the transmitter (e.g., 200B of FIG. 2B). With the special selection of the parameters discussed above relative to the transmitter 200B, the output from the matched filter 520 may be the sequence of high amplitude (i.e., narrow) pulses that can be clearly identified even when the FB-MC-SS signal 120 (FIGS. 1A through 1C) is at a noise level. The combination of the transmit and receive processes may result in a significant and unexpected improvement (both computationally faster and more precise) in timing recovery and frequency lock-in. The FB-MC-SS system improves MC-SS modulation by compensating for frequency and phase difference at the receiver side, providing a carrier and timing acquisition that improves tracking methods, and includes an improved blind channel estimation methodology.

A sequence of narrow pulses 525 from the matched filter 520 may occur at regular intervals and carry the necessary information for timing and carrier acquisition as well as for their tracking. In general, any carrier and timing recovery method takes advantage of the properties of the modulation method that has been used to construct the transmitted signal. Due to the implementation inaccuracies and channel conditions (e.g., accuracy of components and Doppler shift in the channel), the carrier frequency used at the transmitter 200B (FIG. 2B) and its counterpart frequency at the receiver 500 are bound to suffer mismatch.

The carrier recovery unit 530 finds such mismatches and compensates for the mismatches at the receiver 500. To accomplish this carrier recovery, the matched filter 520 may be used to develop relatively efficient carrier and timing recovery algorithms. The output of the matched filter 520 includes the sequence of narrow pulses 525 at the ½ spacing of the symbol timing (T/2). These narrow pulses 525 are present at the time instants that are even multiples of T/2 and correspond to about the center of the data symbols.

On the other hand, at the time instants that are odd multiples of T/2, the presence of such pulses depend on the information bits transmitted before and after the time instant. In other words, and as explained more fully below, the pulse at the odd multiples of T/2 will appear when two consecutive symbols have the same value, otherwise the pulse would be a null. This property of the matched filter 520 enables development of a timing recovery algorithm with a relatively low complexity/processing power. Once the pulses at the even multiples of T/2 are recognized, any carrier offset in the demodulated signal can be identified by comparing the relative phases of the pulses at the successive time instants, leading to carrier frequency recovery.

The carrier recovery unit 530 may receive the sequence of narrow pulses 525 and generate control signals 535 to develop a phase-locked loop (PLL) between the demodulator 510, the matched filter 520, and the carrier recovery unit 530 as is known by those skilled in the art. As the PLL locks on, the phase of the baseband input 515 is known relative to the sequence of narrow pulses 525 from the matched filter 520. As a result, the timing recovery unit 540 may use the sequence of narrow pulses 525 as a synchronization signal to ensure that the demodulated and combined signals from all subcarriers (i.e., the baseband input 515) can be sampled at correct times by the analysis filter bank 550.

The sequence of narrow pulses 525 containing the timing information and the baseband input 515 from the demodulator 510 are passed to the analysis filter bank 550. The analysis filter bank 550 extracts the received signal of each of the various subcarriers in parallel and samples them at a proper timing phase based on the timing information. The analysis filter bank 550 performs the inverse process of the synthesis filter bank 212 of the transmitter 200B (FIG. 2B). Thus, the output of the analysis filter bank 550 is a set of signals 555 corresponding to each of the subcarrier frequencies in the FB-MC-SS signal 120 (FIGS. 1A through 1C). Due to the very low power level of the received signal, some of these signals in the set of signals 555 may not carry accurate information. However, many of the signals in the set of signals 555 will carry the same information that was transmitted.

The channel estimator 560 examines the set of signals 555 corresponding to each of the subcarrier frequencies to estimate a channel gain and a power of noise plus interference at each of the subcarrier bands by computing the impulse response of each channel in both time and frequency domain. Digital Signal Processing (DSP) and Field-Programmable Gate Arrays (FPGAs) may allow for one example of an inexpensive implementation for many of the functions in the receiver 500 and the channel estimator 560 in particular.

The maximum-ratio combining unit 570 receives the set of signals 555 from the analysis filter bank 550 and information 565 at the output of the channel estimator 560 to obtain an estimate of the transmitted data symbols. The maximum-ratio combining unit 570 calculates a weighted average of the detected data symbols at the output of the analysis filter bank 550. The less noisy outputs are given higher weights and the more noisy outputs are given lower weights. To perform the combining, the maximum-ratio combining unit 570 may divide a power estimate of each channel by the mean square of the estimated noise/interference, which may result in either a diminished noise where the signal is stronger or elimination of the certain subcarriers where the noise/interference is higher than the mean noise.

A detailed mathematical discussion of the processes discussed begins with an exploration of the pulse shape g(t). In a case where the channel is ideal and demodulation is performed perfectly, the demodulator output is the transmit baseband signal x(t) given by equation (3) above. Passing the baseband signal x(t) (e.g., the baseband input 515 in FIG. 5) through a filter matched to the transmit pulse shape g(t) yields an overall response of the system defined as:

$$\eta(t) = g(t) \star g^*(-t) \qquad (8)$$

where ★ denotes convolution and the superscript * denotes conjugation. Using equations (4) and (5) above in equation (8) above, and noting that, by design, h(-t)=h(t), yields:

$$\eta(t) = \left(\sum_{k=0}^{N-1} \gamma_k h(t) e^{j2\pi f_k t}\right) \star \left(\sum_{l=0}^{N-1} \gamma_l^* h(t) e^{j2\pi f_l t}\right). \qquad (9)$$

Note that, by design, $h(t)e^{j2\pi f_k t}$ and $h(t)e^{j2\pi f_l t}$ may be thought of as a pair of filters. Such a pair of filters either has a common band (when $f_k = f_l$) or covers non-overlapping bands. In the latter case, $h(t)e^{j2\pi f_k t} \star h(t)e^{j2\pi f_l t} = 0$. Hence, equation (9) above may be reduced to:

$$\eta(t) = \sum_{k=0}^{N-1} |\gamma_k|^2 (h(t) e^{j2\pi f_k t} \star h(t) e^{j2\pi f_k t}). \qquad (10)$$

Straightforward manipulations of equation (10) above and recalling equation (7) above leads to:

$$\eta(t) = \beta(t)\rho(t) \qquad (11)$$

where $\rho(t) = h(t) \star h(t)$, by design, is a Nyquist pulse whose peak appears at t=0, and $$\beta(t) = \sum_{k=0}^{N-1} e^{j2\pi f_k t}. \qquad (12)$$

Figure 6:
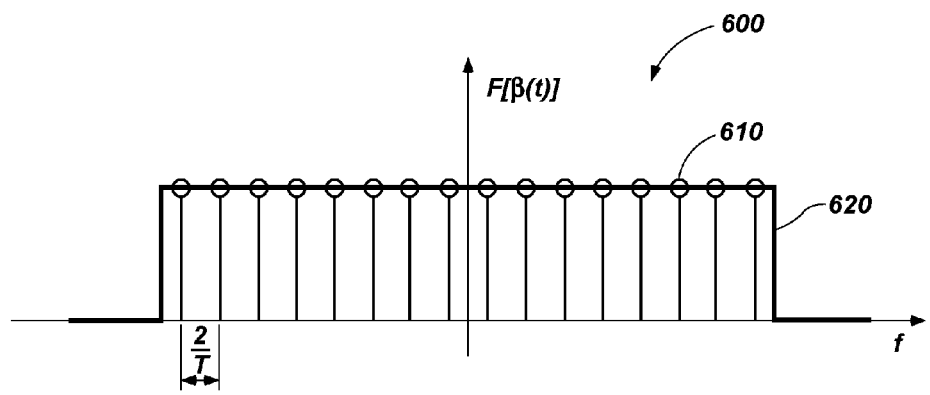
FIG. 6 is a graph illustrating a sine pulse constructed as a summation of complex sine waves.

FIG. 6 is a graph 600 illustrating a sinc pulse constructed as a summation of complex sine waves. In particular, the graph shows the Fourier transform of β(t) as a train of pulses 610 in the frequency domain. One may notice that β(t) is the summation of N complex sine waves all with a unity amplitude. Hence, the Fourier transform of β(t) is effectively a sampled version of a rectangular pulse 620. Note that the samples in the frequency domain are spaced by 2/T. This implies that β(t) is a train of sinc pulses 710 (FIG. 7) spaced in time at the interval T/2. At t=0 and non-integer multiples of T, all the components of β(t) have zero phase and, thus, add up to a value of N. At the points where t is an odd multiple of T/2, all the components of β(t) have the phase of π, and thus add up to a value of −N.

Figure 7:
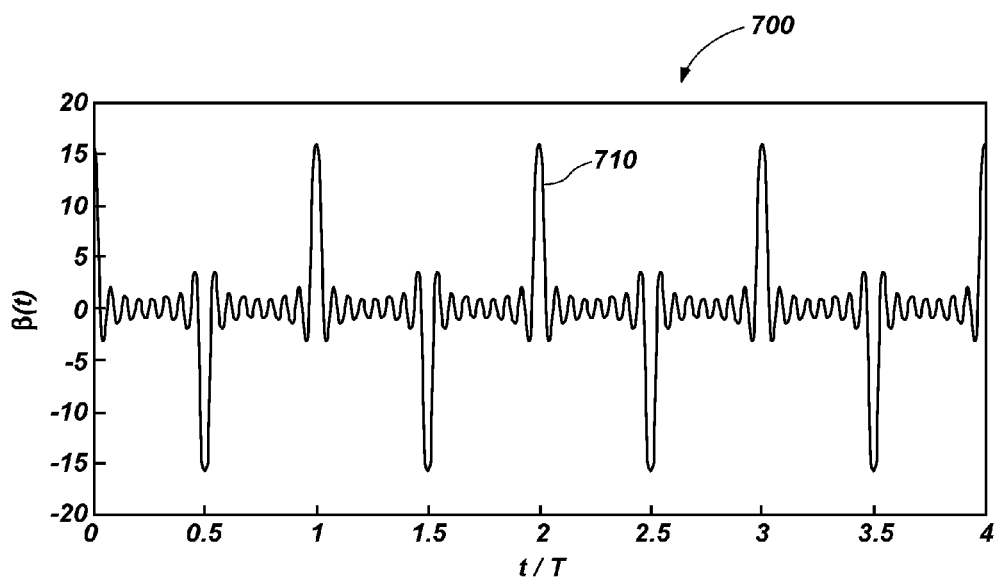
FIG. 7 is a graph illustrating a train of sine pulses from a matched filter spaced in time at intervals of T/2.

FIG. 7 is a graph 700 illustrating a train of sine pulses 710 from the matched filter spaced in time at intervals of T/2. FIG. 7 shows an example of β(t) for the case where N=16. As N increases and approaches infinity, the train of sine pulses 710 approaches an impulse train and, thus, η(t) will approach a waveform consisting of a number of impulses (i.e., narrow and tall pulses, when N is finite, but large) whose magnitudes correspond to the samples (or the negated samples) of the Nyquist pulse ρ(t). When the roll-off factor α=1, it can be shown that there are only three non-zero samples of ρ(t), with values of −0.5, 1, and −0.5 at corresponding positions of t=−T/2, 0, and T/2, respectively. Hence, when α=1 and N→∞, $$\eta(t) = -0.5\delta(t+T/2) + \delta(t) - 0.5\delta(t-T/2). \qquad (13)$$

This result becomes an approximation when N is finite, but sufficiently large. A more precise expression will be to define:

$$\beta_0(t) = \beta(t)\Pi\left(\frac{t}{T_0}\right) \qquad (14)$$

where $\Pi(t/T_0)$ denotes a rectangular pulse with a properly chosen width of $T_0$, and, accordingly, equation (13) above may be written as:

$$\eta(t) = -0.5\beta_0(t+T/2) + \beta_0(t) - 0.5\beta_0(t-T/2). \qquad (15)$$

Equation (15) above defines the system response between the input s(t) and the output of the matched filter g*(−t). Hence, using equation (1) above, it can be shown that the output of the matched filter 520 (FIG. 5) is given by:

$$z(t) = \sum_n s[n]\left(-0.5\beta_0\left(t+\frac{T}{2}-nT\right) + \beta_0(t-nT) - 0.5\beta_0\left(t-\frac{T}{2}-T\right)\right) + \\ v_0(t). \qquad (16)$$

Figure 8:
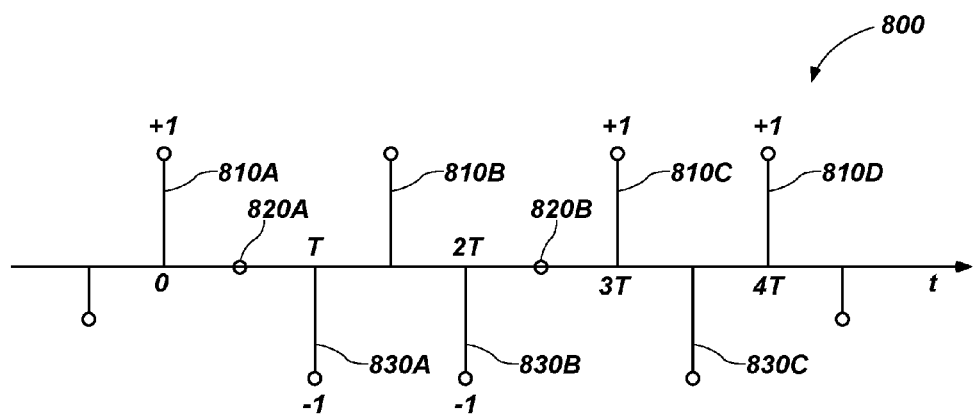
FIG. 8 is a graph illustrating recovery of a data symbol sequence from a matched filter output represented as a train of unit pulses.

FIG. 8 is a graph 800 illustrating recovery of a data symbol sequence from the matched filter output represented as a train of unit pulses. In particular, the graph 800 presents recovery of a typical signal at the output of the matched filter 520 (FIG. 5), where, for clarity of presentation, $\beta_0(t)$ is shown as unit impulses. In general, the impulses each have an amplitude of s[n]. Note that at each position nT an impulse with a unity amplitude appears in either a positive (810A, 810C, and 810D) or negative direction (830A and 830B), where T is a time period between data symbols. At midpoints (i.e., (n+0.5)T) the impulse is zero, if s[n]≠s[n−1]

(shown as 820A and 820B), or is an impulse with an amplitude −s[n], if s[n]=s[n+1] (shown as 810B and 830C). In other words, a change in the polarity of the next symbol is indicated by a zero at the midpoint between positions nT. The next symbol is the same polarity if there is an impulse in the opposite direction at the midpoint (e.g., 810B, 830C) between positions nT.

In the example of FIG. 8, the symbol sequence is: s[n]={+1, −1, −1, +1, +1}. Midpoint 820A is a zero between positions 0 and T, indicating that the next symbol (830A) after a current symbol (810A) is of the opposite polarity. Similarly, midpoint 820B is a zero between the positions 2T and 3T, indicating that the next symbol (810C) after a current symbol (830B) is of the opposite polarity. On the other hand, midpoint 810B is an impulse in the opposite direction between positions T and 2T, indicating that the next symbol (830B) after a current symbol (830A) is of the same polarity. Similarly, midpoint 830C is an impulse in the opposite direction between positions 3T and 4T, indicating that the next symbol (810D) after a current symbol (810C) is of the same polarity.

With respect to the carrier frequency offset, assuming that channel is ideal, but there exists a carrier frequency offset $\Delta f_c$ between the transmitter and receiver, equation (9) above will become:

$$\eta(t) = \left(\sum_{k=0}^{N-1} \gamma_k h(t) e^{j2\pi(f_k + \Delta f_c)t}\right) * \left(\sum_{l=0}^{N-1} \gamma_l^* h(t) e^{j2\pi f_l t}\right). \quad (17)$$

For the case where $0 < \Delta f_c < 2/T$, the subcarrier analysis filters at bands k and k+1 of the receiver will overlap with the transmitted signal from the $k^{th}$ band. Noting this, equation (17) above can yield:

$$\eta(t) = \sum_{k=0}^{N-1} (h(t) e^{j2\pi(f_k + \Delta f_n)t} * h(t) e^{j2\pi f_k t}) + \sum_{k=0}^{N-2} \gamma_k \gamma_{k+1}^* \left(h(t) e^{j2\pi(f_k + \Delta f_c)t} * h(t) e^{j2\pi(f_k + \frac{2}{T})t}\right) \quad (18)$$

Straightforward manipulation of the terms in equation (18) above leads to:

$$\eta(t) = \beta(t)(h(t) e^{j2\pi \Delta f_c t} * h(t)) + \kappa(t)\left(h(t) e^{j2\pi(\Delta f_c - \frac{2}{T})t} * h(t)\right) \quad (19)$$

where β(t) is given by equation (12) above, and:

$$\kappa(t) = e^{j(4\pi/T)t} \sum_{k=0}^{N-2} \gamma_k \gamma_{k+1}^* e^{j2\pi f_k t}. \quad (20)$$

Note that a set of randomly chosen spreading gains $\gamma_k$, κ(t), in general, will appear as a noise-like signal. Hence, the second term on the right-hand side of equation (19) above may be treated as time-limited additive noise. Thus, equation (19) above may be written as:

$$\eta(t) = \beta(t)\rho'(t) + v(t) \quad (21)$$

where:

$$\rho'(t) = h(t) e^{j2\pi \Delta f_c t} \star h(t) \quad (22)$$

and v(t) is an additive noise.

Clearly, for $\Delta f_c = 0$, $\rho'(t)$ reduces to $\rho(t)$. As $\Delta f_c$ deviates from zero, $\rho'(t)$ deviates from $\rho(t)$. However, some special features that can be used for synchronization purposes still remain nearly the same. In particular, $|\rho'(t)|$ preserves the shape of $|\rho(t)|$ to a great extent and its amplitude reduces only slightly over a relatively wide range of $\Delta f_c$.

Figure 9:
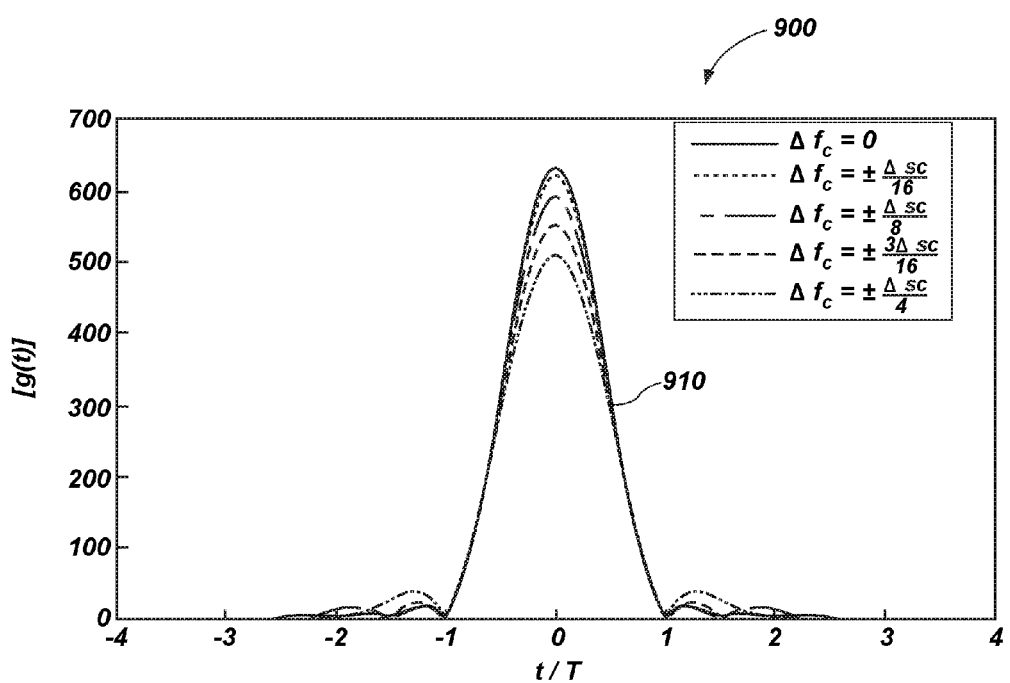
FIG. 9 is a graph illustrating a recovered pulse with different choices for carrier frequency offset.

FIG. 9 is a graph 900 that illustrates a recovered pulse 910 with different choices for carrier frequency offset. The highest amplitude pulse corresponds with the topmost equation in the key shown at the top right of FIG. 9. In other words, the highest amplitude curve corresponds with $\Delta f_c = 0$ and the lowest amplitude curve corresponds with $\Delta f_c = \pm \Delta_{sc}/4$, where $\Delta_{sc} = 2/T$ indicates the subcarrier spacing.

When $\Delta f_c$ approaches 2/T, or passes this value, $\rho'(t)$ vanishes to zero and, thus, no pertinent peak will appear in $\eta(t)$. This, in turn, implies no pertinent peak will appear at the matched filter output, z(t). One can consider this property of the matched filter output to detect the presence of a large frequency offset at the receiver, and, accordingly, search for the correct value of the carrier frequency. For instance, it is possible to run the incoming signal through a set of matched filters tuned to a few choices of $\Delta f_c$ and pick the one that results in pertinent peaks at its output. Further tuning of $\Delta f_c$ can be carried out subsequently.

With respect to the channel impulse response, when the channel is non-ideal, i.e., c(t)≠δ(t), η(t) of equation (13) above becomes:

$$\eta(t) = -0.5c'(t + T/2) + c'(t) - 0.5c'(t - T/2) \quad (23)$$

where:

$$c'(t) = c(t) \star \beta_0(t). \quad (24)$$

For sufficiently large values of T, the three terms on the right-hand side of equation (23) above remain non-overlapping. In fact, for typical values of T and the spread of channel impulse response, c'(t) remains a relatively narrow and tall pulse, or a cluster of narrow and tall pulses.

For channel estimation, once the received signal is carrier compensated and the timing information is obtained, the sampled signal at the outputs of the analysis filter bank 550 satisfies the following set of equations:

$$z_k(nT) = \gamma_k C_{BB}(e^{j2\pi f_k}) s[n] + \vartheta_k(nT), \quad (25)$$

for $k = 0, 1, \ldots, N-1$, where $C_{BB}(e^{j2\pi f_k})$ is the equivalent baseband channel frequency response at the frequency $f_k$ and $\vartheta_k(nT)$ arises from the contributions from noise and interfering signals that may exist in the band of transmission.

Noting that $C_{BB}(e^{j2\pi f_k})$ is the Fourier transform of the samples of the channel impulse response, one can use equation (25) above to obtain an estimate of the channel within an ambiguity factor determined by s[n]. When s[n] is known, equation (25) above provides a unique estimate of the channel. When s[n] is unknown, equation (25) above provides an estimate with a sign ambiguity, since s[n]=±1.

Equation (25) above makes use of one instant of nT for the estimation of the channel impulse/frequency response. In order to average out the noise, and thus obtain a more accurate estimate of the channel impulse response, one may choose to average equation (25) over a number of instants of time nT.

As discussed below, the implementation of an optimum receiver, through the maximum-ratio combining mechanism, requires the estimates of the variance of the elements of the interference vector $\vartheta$(nT). Once the channel estimate is obtained, the latter estimates can be easily obtained by averaging the magnitude square of the noise samples $\vartheta_k$(nT).

Turning to the maximum-ratio combining, substituting the channel estimate $\hat{C}_{BB}(e^{j2\pi f_k})$ in equation (25) above, a simple rearrangement leads to:

$$s'_k[n] = \frac{\gamma_k^*}{\hat{C}_{BB}(e^{j2\pi f_k})} z_k(nT), \quad (26)$$

where:

$$s'_k[n] = s[n] + \frac{\gamma_k^*}{\hat{C}_{BB}(e^{j2\pi f_k})} \vartheta_k(nT), \quad (27)$$

for k=0, 1, . . . , N−1, is a set of noisy estimates of s[n].

One goal may be to combine these noisy estimates to construct an estimate of s[n] with a minimum variance. This construction can be defined as:

$$\hat{s}[n] = w_o^H s'[n] \quad (28)$$

where:

$$w_o \operatorname*{argmin}_w E[|w^H \vartheta'[n]|^2] \quad (29)$$

subject to the constraint $w^H u = 1$, $\vartheta'[n]$ has the elements $$\frac{\gamma_k^*}{\hat{C}_{BB}(e^{j2\pi f_k})} \vartheta_k(nT),$$

and u is a vector of length N with elements of 1. This problem can be solved using the method of Lagrange multipliers, which results in:

$$w_o = \frac{1}{u^T R_{\vartheta'\vartheta'}^{-1} u} R_{\vartheta'\vartheta'}^{-1} u \quad (30)$$

where $R_{\vartheta'\vartheta'} = E[\vartheta'[n]\vartheta'^H[n]]$. Moreover, the variance of the estimation error is obtained as $E[|w_o^H \vartheta'[n]|^2] = 1/(u^T R_{\vartheta'\vartheta'}^{-1} u)$.

In embodiments of the present disclosure, the subcarrier bands are non-overlapping and $R_{\vartheta'\vartheta'}$ is a diagonal matrix. As a result, using $\sigma_k^2$ to denote the variance of $\vartheta_k$(nT) leads to:

$$R_{\vartheta'\vartheta'} = \begin{bmatrix} \frac{\sigma_0^2}{|\hat{C}_{BB}(e^{j2\pi f_0})|^2} & 0 & \cdots & 0 \\ 0 & \frac{\sigma_1^2}{|\hat{C}_{BB}(e^{j2\pi f_1})|^2} & \cdots & 0 \\ \vdots & \vdots & \ddots & \vdots \\ 0 & 0 & \cdots & \frac{\sigma_{N-1}^2}{|\hat{C}_{BB}(e^{j2\pi f_{N-1}})|^2} \end{bmatrix}. \quad (31)$$

Using equation (31) above in equation (30) above leads to:

$$w_o = \frac{1}{\sum_{k=0}^{N-1} \frac{|\hat{C}_{BB}(e^{j2\pi f_k})|^2}{\sigma_k^2}} \begin{bmatrix} \frac{|\hat{C}_{BB}(e^{j2\pi f_0})|^2}{\sigma_0^2} \\ \frac{|\hat{C}_{BB}(e^{j2\pi f_1})|^2}{\sigma_1^2} \\ \vdots \\ \frac{|\hat{C}_{BB}(e^{j2\pi f_{N-1}})|^2}{\sigma_{N-1}^2} \end{bmatrix}. \quad (32)$$

Many extensions, modifications, or a combination thereof to the proposed transmitter 200 and receiver 500 are possible. As non-limiting examples, a few are mentioned here. However, a person of ordinary skill in the art would understand that many more modifications and extensions are possible.

The matched filter may be defined as:

$$g^*(-t) = \sum_{k=0}^{N-1} \gamma_k^* h(t) e^{j2\pi f_k t}$$

which includes all the subcarriers. It may be possible to use a modified matched filter:

$$g'^*(-t) = \sum_{k \in \mathcal{K}} \gamma_k^* h(t) e^{j2\pi f_k t} \quad (33)$$

where K is a subset of {0, 1, . . . , N−1} (i.e., only a subset of subcarriers is included in the matched filtering). This change preserves the pertinent properties of the filtered signal z(t) that was used for synchronization purposes. At the same time, this modified matched filter can reduce the effect of strong interferers.

So far, it has been assumed that a symbol s[n] is spread across all the subcarriers at one instant of time nT. A number of symbols (e.g., s1[n], s2[n], . . . , sM[n]) may be transmitted simultaneously, each of them distributed over a subset of subcarriers. This method will allow an increase in the data rate at a cost of reduced processing gain. Alternatively, one may choose to transmit the same data symbols over a number of time instants, say, nT, (n+1)T, . . . (n+P−1)T, (i.e., a period of PT seconds). This method may allow an increase in the processing gain at a cost of reduced data rate.

In the maximum-ratio combining equations presented above, signals from all subcarriers were considered. Clearly, subcarriers that are affected by a significant interference (possibly from a presence of primary users) may be excluded from the equations to reduce the computational complexity.

CONCLUSION

Embodiments of the present disclosure include apparatuses and methods for generating and receiving multi-carrier spread-spectrum signals carrying information at a very low power level distributed over the frequency spectrum.

In some embodiments, a method includes transmitting a spread-spectrum signal by spreading a data symbol to a plurality of frequencies across a frequency spectrum by encoding the data symbol on each frequency of the plurality. A common pulse-shaping filter is applied to each frequency of the plurality of frequencies including the data symbol. A plurality of gains is applied to the plurality of frequencies including the data symbol, wherein each gain of the plurality of gains is correlated to each frequency of the plurality of frequencies. The plurality of frequencies is combined to generate the spread-spectrum signal and the spread-spectrum signal is transmitted.

In some embodiments, a spread-spectrum transmitter includes a synthesis filter bank and a spectrum distribution module. The synthesis filter bank is configured for spreading a data symbol to a plurality of frequencies across a frequency spectrum by encoding the data symbol on each frequency of the plurality of frequencies, and applying a common pulse-shaping filter to each frequency of the plurality of frequencies including the data symbol. The synthesis filter bank is also configured for applying a plurality of gains to the plurality of frequencies including the data symbol, wherein each gain of the plurality of gains is correlated to each frequency among the plurality of frequencies. The spectrum distribution module is configured for modulating each frequency of the plurality of frequencies onto a different subcarrier, wherein the different subcarriers are substantially evenly spaced across the frequency spectrum.

In some embodiments, a method includes receiving a spread-spectrum signal including a plurality of frequencies across a frequency spectrum generated by a synthesis filter bank in a transmitter. The spread-spectrum signal is filtered with a matched filter matched to the synthesis filter bank by substantially simultaneously filtering each frequency of the plurality of frequencies to generate a sequence of narrow pulses. The sequence of narrow pulses is phase locked to the spread-spectrum signal.

In some embodiments, a method of receiving a spread-spectrum signal includes receiving a spread-spectrum signal including a plurality of frequencies across a frequency spectrum generated by a synthesis filter bank in a transmitter. The spread-spectrum signal is filtered with an analysis filter bank matched to the synthesis filter bank by substantially simultaneously filtering each frequency of the plurality of frequencies to generate a set of signals corresponding to each frequency of the plurality of frequencies. At least some of the set of signals corresponding to at least some of the frequencies of the plurality of frequencies are averaged, and a data symbol is derived from the result of the averaging.

In some embodiments, a spread-spectrum receiver includes a demodulator, a matched filter, and a carrier recovery unit. The demodulator is configured for converting a radio frequency input to a spread-spectrum signal in a baseband. The matched filter is configured for receiving the spread-spectrum signal including a plurality of frequencies across a frequency spectrum generated by a synthesis filter bank in a transmitter, and filtering the spread-spectrum signal with a common filter having characteristics matched to the synthesis filter bank and substantially simultaneously filtering each frequency of the plurality of frequencies to generate a sequence of narrow pulses. The carrier recovery unit is configured for generating control signals responsive to the sequence of narrow pulses suitable for generating a phase-locked loop between the demodulator, the matched filter, and the carrier recovery unit.

While the disclosure is susceptible to various modifications and implementation in alternative forms, specific embodiments have been shown by way of examples in the drawings and have been described in detail herein. However, it should be understood that the invention is not intended to be limited to the particular forms disclosed. Rather, the invention includes all modifications, equivalents, and alternatives falling within the scope of the following appended claims and their legal equivalents.

What is claimed is:

1. A method, comprising:
    receiving, at a receiver, a Filter-Bank Multi-Carrier Spread-Spectrum (FB-MC-SS) signal as an underlay control channel having a power level below an apparent noise level for other signals of a frequency spectrum, wherein the FB-MC-SS includes at least one data symbol redundantly modulated onto each subcarrier of the FB-MC-SS signal such that each subcarrier includes the same at least one data symbol;
    demodulating, with a demodulator of the receiver, the FB-MC-SS signal to generate a baseband signal; and
    extracting, with an analysis filter bank of the receiver, a received signal from each subcarrier of the baseband signal by performing an inverse process of a synthesis filter bank of a transmitter that generated the FB-MC-SS signal.

2. The method of claim 1, receiving, at the receiver, another communication signal as an overlay channel having a power level above the apparent noise level.

3. The method of claim 2, further comprising masking out the another communication signal that interferes with a subgroup of the FB-MC-SS signal.

4. The method of claim 3, wherein masking out the another communication signal that interferes with a subgroup of the FB-MC-SS signal includes:
    receiving a set of received signals from the analysis filter bank;
    receiving an estimate of channel gain for the set of received signals; and
    generating an estimate of at least one transmitted data symbol based, at least in part, on the received signals and the estimate of the channel gain.

5. The method of claim 1, further comprising filtering the baseband signal with a matched filter having filter characteristics matched to those of the synthesis filter bank of the transmitter that generated the FB-MC-SS signal.

6. The method of claim 5, wherein filtering the baseband signal with a matched filter includes generating a matched filter output with a sequence of narrow pulses from the baseband signal.

7. The method of claim 6, wherein the sequence of narrow pulses are spaced in time at intervals of T/2, and wherein T is a time period between data symbols of the FB-MC-SS signal.

8. The method of claim 1, wherein receiving the FB-MC-SS signal includes receiving the FB-MC-SS signal as one of an orthogonal frequency-division multiplexing (OFDM)

based spread spectrum signal or as a filtered multi-tone (FMT) based spread spectrum signal.

9. The method of claim 1, further comprising receiving a communication signal as an overlay signal having a power level above the apparent noise level and over a subgroup of the FB-MC-SS signal and within a clear band from interference by other communication signals that exist within the frequency spectrum in an adaptive radio setting.

10. The method of claim 9, wherein receiving the communication signal includes receiving a Filter-Bank Multi-Carrier (FB-MC) signal as the overlay signal.

11. The method of claim 1, wherein demodulating is performed according to a modulation scheme selected from the group consisting of a binary phase shift keying (BPSK) a scheme, quadrature phase shift keying (QPSK) scheme, and a quadrature amplitude modulation (QAM) scheme.

12. A spread-spectrum receiver for detecting and decoding a signal, the spread-spectrum receiver comprising:
    a demodulator configured to:
        receive a Filter-Bank Multi-Carrier Spread-Spectrum (FB-MC-SS) signal as an underlay control channel having a power level below an apparent noise level for other signals of a frequency spectrum, wherein the FB-MC-SS includes least one data symbol redundantly modulated onto each subcarrier of the FB-MC-SS signal such that each subcarrier includes the same at least one data symbol; and
        convert the FB-MC-SS signal to a baseband signal; and
    an analysis filter bank configured to:
        extract a received signal from each subcarrier of the baseband signal by performing an inverse process of a synthesis filter bank of a transmitter that generated the FB-MC-SS signal; and
        generate an analysis filter bank output with a set of signals corresponding to each subcarrier frequency in the FB-MC-SS signal.

13. The spread-spectrum receiver of claim 12, further comprising:
    a matched filter configured to:
        receive the baseband signal from the demodulator; and
        generate a matched filter output with a sequence of narrow pulses from the baseband signal; and
    a carrier recovery unit configured to:
        receive the matched filter output from the matched filter; and
        generate control signals for the demodulator to regulate the baseband signal generated by the demodulator.

14. The spread-spectrum receiver of claim 13, wherein the demodulator, the matched filter, and the carrier recovery unit are configured as a phase-locked loop (PLL).

15. The spread-spectrum receiver of claim 13, wherein the matched filter has filter characteristics matched to a synthesis filter bank in the transmitter.

16. The spread-spectrum receiver of claim 15, wherein the synthesis filter bank includes a square-root Nyquist filter applied to each band of the synthesis filter bank.

17. The spread-spectrum receiver of claim 13, further comprising:
    a timing recovery unit configured to:
        receive the matched filter output from the matched filter; and
        generate a synchronization signal for the analysis filter bank to sample the baseband signal to generate the analysis filter bank output.

18. The receiver of claim 17, wherein the analysis filter bank is configured to sample and extract the received signal from each subcarrier of the baseband signal in parallel.

19. The receiver of claim 13, further comprising:
    a channel estimator configured to:
        receive the analysis filter bank output from the analysis filter bank; and
        estimate a channel gain and a power of noise plus interference at each subcarrier of the analysis filter bank output; and
    a maximum-ratio combining unit configured to:
        receive the analysis filter bank output from the analysis filter bank;
        receive the channel gain estimate and the power of noise plus interference estimate from the channel estimator; and
        generate a receiver output as detected data symbols for the FB-MC-SS signal.

20. The receiver of claim 19, wherein the channel estimator is configured to estimate a channel gain and a power of noise plus interference at each subcarrier band of the analysis filter bank output by computing an impulse response of each subcarrier in both time and frequency domains.

21. The receiver of claim 19, wherein the maximum-ratio combining unit is configured to determine a weighted average for the analysis filter bank output such that less noisy outputs are given a higher weight relative to more noisy outputs that are given a lower weight.

22. The receiver of claim 19, wherein the maximum-ratio combining unit is configured to generate the receiver output by combining the subcarriers of the analysis filter bank output including dividing the channel gain estimate for each subcarrier by a mean square of the power of noise plus interference estimate for each subcarrier.

23. The receiver of claim 19, wherein the maximum-ratio combining unit is configured to generate the receiver output by combining the subcarriers of the analysis filter bank output including:
    reducing noise if the channel gain estimate is greater than the power of noise plus interference estimate; and
    eliminating subcarriers if the power of noise plus interference estimate is greater than the channel gain estimate.

* * * * *

UNITED STATES PATENT AND TRADEMARK OFFICE
CERTIFICATE OF CORRECTION

PATENT NO. : 9,559,748 B2  
APPLICATION NO. : 15/061157  
DATED : January 31, 2017  
INVENTOR(S) : Hussein Moradi et al.

Page 1 of 1

It is certified that error appears in the above-identified patent and that said Letters Patent is hereby corrected as shown below:

In the Specification

Column 1, Line 9, change "Sep. 26, 2014, which" to --Sep. 26, 2014, now U.S. Pat. 9,369,866, issued June 14, 2016, which--

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*